(12) United States Patent
Hodgson

(10) Patent No.: US 12,350,625 B2
(45) Date of Patent: Jul. 8, 2025

(54) SCALABLE TANGENTIAL FLOW FILTRATION METHOD AND RETROFIT KIT

(71) Applicant: Innovative Engineering Systems, Inc., Bakersfield, CA (US)

(72) Inventor: Dennis Troy Hodgson, Vacaville, CA (US)

(73) Assignee: INNOVATIVE ENGINEERING SYSTEMS, INC., Bakersfield, CA (US)

( * ) Notice: Subject to any disclaimer, the term of this patent is extended or adjusted under 35 U.S.C. 154(b) by 0 days.

(21) Appl. No.: 17/739,394

(22) Filed: May 9, 2022

(65) Prior Publication Data

US 2022/0355249 A1   Nov. 10, 2022

Related U.S. Application Data

(60) Provisional application No. 63/243,418, filed on Sep. 13, 2021, provisional application No. 63/186,688, filed on May 10, 2021.

(51) Int. Cl.
*B01D 61/20* (2006.01)
*B01D 61/22* (2006.01)

(52) U.S. Cl.
CPC ............ *B01D 61/20* (2013.01); *B01D 61/22* (2013.01); *B01D 2311/14* (2013.01);
(Continued)

(58) Field of Classification Search
CPC .... B01D 61/20; B01D 61/22; B01D 2311/14; B01D 2311/18; B01D 2313/243;
(Continued)

(56) References Cited

U.S. PATENT DOCUMENTS 5,217,627 A * 6/1993 Pall .................... A61M 1/0209
  604/6.02
7,357,567 B2   4/2008 Terentiev
(Continued)

OTHER PUBLICATIONS

Matos, Taina; Written Opinion of the International Search Authority; Jul. 27, 2022; pp. 9; Alexandria, VA.
(Continued)

*Primary Examiner* — Pranav N Patel
(74) *Attorney, Agent, or Firm* — STETINA GARRED BRUCKER & NEWBOLES

(57) ABSTRACT

A method for modifying the flow capabilities of an existing tangential flow filtration (TFF) system is contemplated in which the processing capabilities of the existing static TFF system may be increased without requiring the addition of additional systems running in parallel. This may be achieved via adjusting or replacing certain of the components of the TFF skid to accommodate a tubing set having a larger (or smaller) internal diameter than the existing tubing set or the tubing set for which the TFF system was originally manufactured. In this fashion, it may be seen that an existing skid may have its flow capabilities dramatically increased. It is further contemplated that a retrofit kit for an existing TFF system for use according to the described method may be provided.

5 Claims, 1 Drawing Sheet

(52) U.S. Cl.
CPC .... *B01D 2311/18* (2013.01); *B01D 2313/243* (2013.01); *B01D 2313/90* (2013.01); *B01D 2315/10* (2013.01)

(58) Field of Classification Search
CPC ............ B01D 2313/90; B01D 2315/10; B01D 2313/08; B01D 61/18; B01D 2313/18; B01D 2313/60
See application file for complete search history.

(56) References Cited

U.S. PATENT DOCUMENTS

| | | | |
|---|---|---|---|
| 7,481,572 B2 | 1/2009 | Terentiev | |
| 7,762,716 B2 | 7/2010 | Terentiev | |
| 8,282,269 B2 | 10/2012 | Terentiev | |
| 2003/0116487 A1* | 6/2003 | Petersen | B01D 61/10 210/85 |
| 2003/0194332 A1* | 10/2003 | Jahn | F04B 43/0733 417/395 |
| 2007/0102339 A1 | 5/2007 | Cote et al. | |
| 2014/0299532 A1 | 10/2014 | Becker et al. | |
| 2015/0083665 A1 | 3/2015 | Oranth et al. | |
| 2018/0221822 A1 | 8/2018 | Nutalapati et al. | |
| 2018/0221823 A1* | 8/2018 | Nutalapati | C07K 1/34 |
| 2019/0381458 A1 | 12/2019 | de los Reyes et al. | |

OTHER PUBLICATIONS

PALL Biotech; LevMixer System; 2020; 5 pages; Port Washington, New York.

Thermofisher Scientific; Single-use mixing technologies HyPerforma and imPULSE single-use mixing systems for applications across the bioprocessing workflow; 2020; 12 pages.

* cited by examiner

SCALABLE TANGENTIAL FLOW FILTRATION METHOD AND RETROFIT KIT

CROSS-REFERENCE TO RELATED APPLICATIONS

This patent application claims the benefit and priority of U.S. Provisional Patent Application No. 63/186,688, entitled SINGLE USE SCALABLE SKID FOR TANGENTIAL FLOW FILTRATION AND CHROMATOGRAPHY, filed on May 10, 2021, and U.S. Provisional Patent Application No. 63/243,418, entitled SINGLE USE SCALABLE SKID FOR TANGENTIAL FLOW FILTRATION AND CHROMATOGRAPHY, filed on Sep. 13, 2021, the disclosure of each of which are incorporated by reference herein in its entirety as part of the present application.

STATEMENT RE: FEDERALLY SPONSORED RESEARCH/DEVELOPMENT

Not Applicable

BACKGROUND

1. Technical Field

The present disclosure relates generally to the fields of tangential flow filtration and chromatography. More particularly, the present disclosure relates to systems and methods for modifying the flow capabilities of an existing tangential flow filtration system in a fashion which permits scalability of that existing system to allow for substantial increase or decrease in flow capabilities.

Filtration is typically performed to separate, clarify, modify, and/or concentrate a fluid solution, mixture, or suspension. In the biotechnology, pharmaceutical, and medical industries, filtration is vital for the successful production, processing, and analysis of drugs, diagnostics, and chemicals as well as many other products. For example, filtration may be used to sterilize fluids and to clarify a complex suspension into a filtered "clear" fraction and an unfiltered fraction. Similarly, constituents in a suspension may be concentrated by removing or "filtering out" the suspending medium. Further, with appropriate selection of filter material, filter pore size and/or other filter variables, many other specialized filter uses have been developed; these may involve selective isolation of constituents from various sources, including cultures of microorganisms, blood, as well as other fluids that may be solutions, mixtures, or suspensions.

Tangential Flow Filtration (TFF), also known as crossflow filtration, is a method of filtering during which a majority of a fluid flow travels tangentially across a surface of a filter, rather than into and through the filter. A principal advantage of this is that materials which may be typically retained on the surface of the filter, which can block the filter and cause reduced efficiency and lifetime, are substantially washed away during the filtration process, increasing the length of time that a filter unit can be operational. Moreover, TFF can be a continuous process, unlike dead-end filtration, which is a batch process. In crossflow filtration, the fluid flow is passed across the filter membrane (tangentially) at positive pressure relative to the permeate side (i.e., downstream of the filter or membrane). A proportion of the components of the fluid which are desired to be filtered, which are smaller than a membrane pore size, passes through the membrane as permeate or filtrate; wherein all else is retained on the feed side of the membrane as retentate. With crossflow filtration, the tangential motion of the bulk of the fluid across the membrane causes trapped particles on the filter surface to be rubbed off. This means that a TFF filter can operate continuously at relatively high solids loads without blockage.

TFF modules are used for ultrafiltration, diafiltration, and microfiltration of biological macromolecules, which is typically the last operation in the downstream processing of therapeutic macromolecules used to concentrate materials for final formulation. TFF modules operate typically using an ultrafiltration membrane that retains the molecule of interest on the retentate side by size-exclusion, where one subset of the components of the fluid (desired or undesired) pass through the membrane into the permeate side. TFF modules are typically self-contained, and usually provided as cassette devices.

Current TFF systems suffer from a number of drawbacks, including insufficient scalability (e.g., for scale-up or scale-down. Accordingly, there is a need for improved TFF systems that are scalable, including methods of scaling up and scaling down existing TFF systems, and retrofit kits for scaling up and scaling down such existing TFF systems.

BRIEF SUMMARY

To solve these and other problems, a method for modifying the flow capabilities of an existing tangential flow filtration (TFF) system (colloquially termed a "skid") is contemplated in which the processing capabilities of the existing TFF system may be increased without requiring the addition of additional skids to run in parallel. This may be achieved via adjusting or replacing certain of the components of the TFF skid to accommodate a tubing set having a larger (or smaller) internal diameter than the existing tubing set or the tubing set for which the TFF system was originally manufactured. In this fashion, it may be seen that an existing skid may have its flow capabilities dramatically increased. It is further contemplated that a retrofit kit for an existing TFF system for use according to the described method may be provided according to the present disclosure.

According to one embodiment of the present disclosure, a method for modifying the flow capabilities of an existing tangential flow filtration system having at least a feed pump and a tangential flow filtration module is contemplated, the method comprising the steps of providing a tubing set having a selected internal diameter, the tubing set being operative to a define at least a feed flow path between the feed pump and the tangential flow filtration module, and a retentate flow path downstream of the tangential flow filtration module, configuring the tangential flow filtration system to incorporate a pump head 26 at the feed pump suitable for the selected internal diameter, configuring the tangential flow filtration system to incorporate one or more pressure sensors suitable for the selected internal diameter, the one or more pressure sensors being operative to measure fluid within at least one of the feed flow path and the retentate flow path, configuring the tangential flow filtration system to incorporate one or more conductivity sensors suitable for the selected internal diameter, the one or more conductivity sensors being operative to measure fluid within at least one of the feed flow path and the retentate flow path, configuring the tangential flow filtration system to incorporate one or more flow sensors suitable for the selected internal diameter, the flow sensor being operative to measure fluid within at least one of the feed flow path and the retentate flow path, and installing the tubing set having the selected internal diameter at the tangential flow filtration system.

It is further contemplated that the provided tubing set may have a selected external diameter, and the contemplated method may further comprise the step of configuring the tangential flow filtration system with one or more pinch valves suitable for operating with a tubing set having the selected external diameter.

The tangential flow filtration system may further include a controller, and the contemplated method may further comprise the step of configuring the controller to interface with the incorporated one or more pressure sensors, conductivity sensors, and flow sensors.

The controller may be configured to be selectably transitionable between a first internal diameter configuration and a second internal diameter configuration in response to a determined internal diameter of the provided tubing set. Each of the first and second internal diameter configurations may have a set of control parameters associated therewith, and the controller may be operative to control at least the feed pump in accordance with a predefined set of control parameters associated with the selected one of the first and second internal diameter configurations.

The controller may be operative to receive an inputted desired flow rate, wherein each predefined set of control parameters is configured to cause the controller to control at least the feed pump in accordance with the inputted desired flow rate. The controller may also be operative to vary control at least the feed pump in accordance with feedback from one or more of one or more pressure sensors, conductivity sensors, and the flow sensors. The controller may be further operative to vary control at least the feed pump in accordance with feedback from at least one of the flow sensors to in order to cause a flow rate derived from measurements taken at the one or more flow sensors to converge with the inputted desired flow rate.

The contemplated method may further comprise the step of configuring the tangential flow filtration system to incorporate a pH sensor suitable for the selected internal diameter, or may further comprise the step of configuring the tangential flow filtration system to incorporate a backpres sure valve suitable for the selected internal diameter.

According to another embodiment of the contemplated disclosure, a retrofit kit for an existing tangential flow filtration system having at least a feed pump and a tangential flow filtration module is contemplated, the retrofit kit comprising a tubing set having a selected internal diameter, the tubing set comprising at least a feed flow path section for placement between a feed pump and a tangential flow filtration module of an existing tangential flow filtration system, and a retentate flow path section for placement downstream of the tangential flow filtration module, one or more pressure sensors interoperative with the selected internal diameter of the tubing set, the one or more pressure sensors being operative to measure fluid within at least one of the feed flow path section and the retentate flow path section, one or more conductivity sensors interoperative with the selected internal diameter of the tubing set, the one or more pressure sensors being operative to measure fluid within at least one of the feed flow path section and the retentate flow path section, and one or more flow sensors interoperative with the selected internal diameter of the tubing set, the one or more pressure sensors being operative to measure fluid within at least one of the feed flow path section and the retentate flow path section.

According to father contemplated embodiments, the tubing set in the retrofit kit is contemplated to have a selected external diameter, with the retrofit kit further comprising one or more pinch valves or components thereof suitable for operating with the tubing set having the selected external diameter.

According to certain contemplated embodiments where the tangential flow filtration system further includes a controller, the retrofit kit may further comprise a non-transitory computer readable medium, the medium tangibly embodying one or more programs of instructions executable by the controller to enable the controller to receive measurements taken by the one or more pressure sensors, conductivity sensors, and flow sensors.

The retrofit kit may further comprise a non-transitory computer readable medium, the medium tangibly embodying one or more programs of instructions executable by the controller to enable the controller to be selectably transitionable between a first internal diameter configuration and a second internal diameter configuration, at least the second internal diameter configuration corresponding to the selected internal diameter of the tubing set.

According to various refinements thereof, each of the first and second internal diameter configurations may have a set of control parameters associated therewith, wherein the controller is further enabled by the one or more programs of instructions to control at least the feed pump in accordance with a predefined set of control parameters associated with the selected one of the first and second internal diameter configurations.

The controller may be further enabled by the one or more programs of instructions to receive an inputted desired flow rate, and wherein each predefined set of control parameters is configured to enable the controller to control at least the feed pump in accordance with the inputted desired flow rate. The controller may be further enabled by the one or more programs of instructions of to vary control at least the feed pump in accordance with feedback from one or more of one or more pressure sensors, conductivity sensors, and the flow sensors. The one or more programs of instructions may also enable the controller to be operative to receive an inputted desired flow rate, and to vary control of at least the feed pump in accordance with feedback from at least one of the flow sensors to in order to cause a flow rate derived from measurements taken at the one or more flow sensors to converge with the inputted desired flow rate.

The retrofit kit is also contemplated to further comprise one or more pH sensors interoperative with the selected tubing set, the one or more pH sensors being operative to measure fluid within at least one of the feed flow path section and the retentate flow path section. The retrofit kit may also further comprise a backpressure valve interoperative with the selected internal diameter of the tubing set.

BRIEF DESCRIPTION OF THE DRAWINGS

These and other features and advantages of the various embodiments disclosed herein are better understood with respect to the following descriptions and drawings, in which.

DETAILED DESCRIPTION

Figure 1:
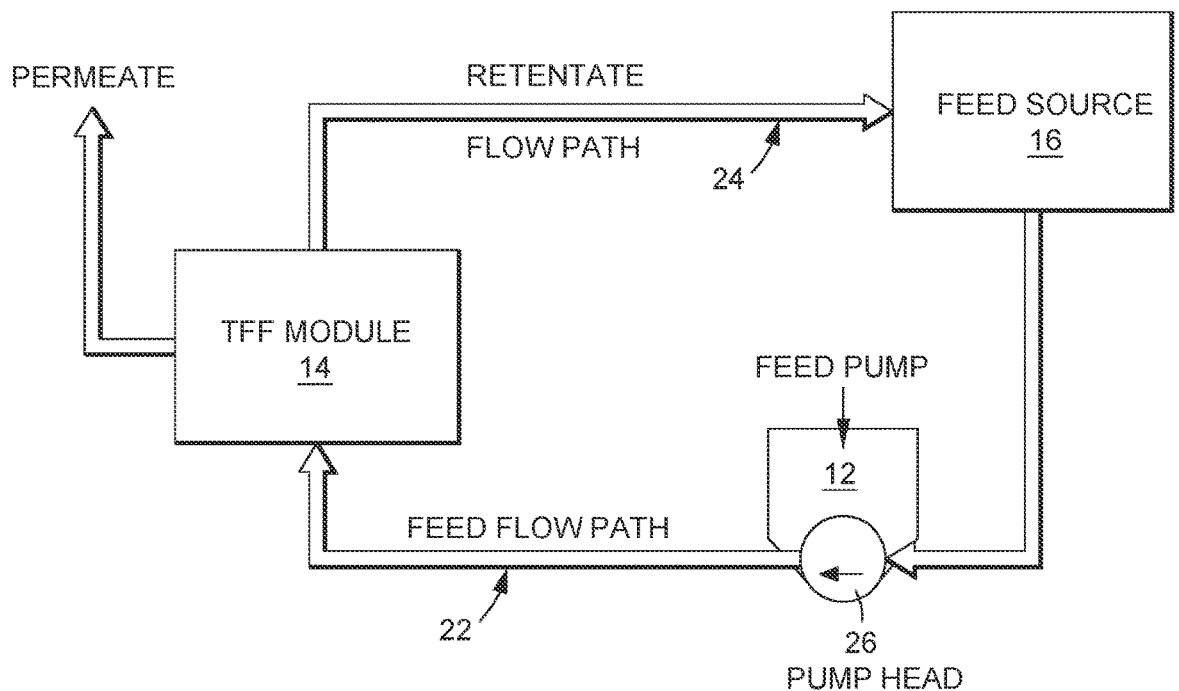
FIG. 1 is a schematic diagram showing an exemplary TFF system.
Figure 2:
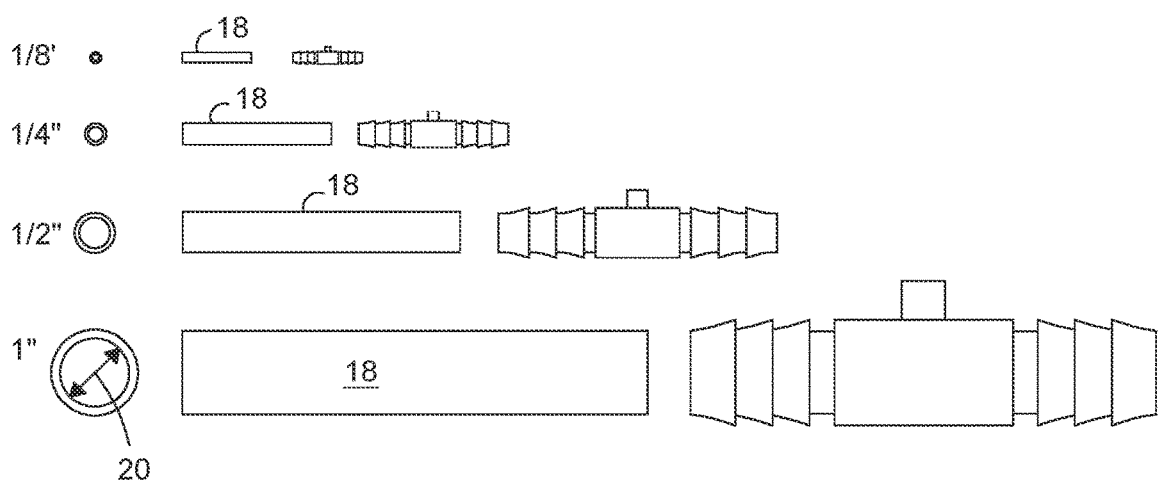
FIG. 2 is an illustration of a number of tubing sets having different sizes.

Common reference numerals are used throughout the drawings and the detailed description to indicate the same elements.

As is contemplated by the disclosure herein, a method for modifying the flow capabilities of an existing tangential flow filtration (TFF) system 10 is contemplated in which the processing capabilities of the existing static TFF system 10 may be increased without requiring the addition of additional skids to run in parallel. This may be achieved via adjusting or replacing certain of the components of the TFF skid to accommodate a tubing set 18 having a larger (or smaller) internal diameter 20 than the existing tubing set or the tubing set for which the TFF system 10 was originally manufactured. In this fashion, it may be seen that an existing skid may have its flow capabilities dramatically increased. It is further contemplated that a retrofit kit for an existing TFF system 10 for use according to the described method may be provided according to the present disclosure.

A conventional TFF system 10 will generally include a fluid source 16 for providing a source of the feed fluid, a feed pump 12 for advancing the feed fluid along a feed flow path 22 and for pressurizing the feed fluid, and a tangential flow filtration module 14 which receives the feed fluid at an inlet to generate a permeate and a retentate. The permeate is generally output from the TFF module 14 at an permeate outlet to a permeate flow path, and the retentate is generally output from the TFF module 14 at a retentate outlet to a retentate flow path 24. Generally, most TFF processes will typically recirculate the retentate through the TFF system 10 while continually removing undesired permeate in order to produce a highly concentrate retentate, optionally in combination with one or more other techniques such as chromatography in order to produce a highly purified retentate. However, depending on the identity of the substance that is desired to be concentrated or filtered out by the TFF system 10, as well as the specific pore sizes and other parameters chosen for the TFF process, it may be that many different configurations of TFF modules 14 may be utilized, including, for example, the use of multiple TFF modules 14 in sequence which may, for example, perform a first-state filtration which retains a permeate by utilizing a filter pore size larger than the target molecule in order to remove oversized components of the feed fluid, followed by a second-stage filtration utilizing a filter pore size smaller than the target molecule whereby the retentate is collected, thus removing components of the feed fluid smaller than the target molecule. As may be understood by one of skill in the art, there are many different schemes for TFF filtration, and it should be appreciated that the disclosure herein will be applicable to most or all of these schemes.

It may be appreciated that an important aspect of a TFF system 10 is its flow capability. Typically, most TFF systems 10 have a static flow capability, in that the internal diameter (ID) of the tubings which define the flow paths will generally serve as the primary limitation on the amount of feed fluid which may be processed through the system in a given amount of time. This is due to the fact that the TFF modules 14 typically operate efficiently only when supplied with feed fluid at a particular window of pressures and velocities. For example, in a typical TFF system 10 using tubings of consistent diameter along at least the feed flow path 22 between the feed pump 12 and the TFF module 14 and a retentate flow path 24 downstream of the TFF module 14, a ⅛ inch ID tubing will be suitable for operations at flow volumes of between about 1-500 mL/min, a ¼ inch ID tubing will be suitable for operations at flow volumes of between about 17-3000 mL/min, and a ½ inch ID tubing will be suitable for operations at flow volumes of between about 0.167-20 L/min. As may be seen, as the tubing ID 20 increases linearly, if the same pressure and flowrate is maintained, the total flow volume will generally increase roughly quadratically. Typical tubings in TFF system may be formed of, for example but without limitation, silicone tubings. However, it may be seen that tubings formed of any materials may be suitable for use according to the present disclosure.

Accordingly, most users of TFF systems 10, when they find that they require additionally processing capability, will generally be required to obtain a new TFF systems 10 capable of higher flow rates, or supplemental TFF systems 10 so that they are able to operate the original system and the supplementary system in parallel, which. This is because, generally speaking, most TFF systems 10 are designed only to operate using a single tubing size, owing to the many particularized fittings, valves, attachment points, and operating parameters of the other components of the TFF system 10, which are generally particularized to the size of the tubing set 18. However, it may be appreciated that, if an existing TFF system 10 could be modified to operate with a larger ID tubing, then substantial cost savings could be achieved relative to the alternative of procuring an entirely new TFF system 10 capable of handling the desired flow rate.

Accordingly, it is contemplated that to successfully modify the flow capabilities of an existing TFF system 10 having at least a feed pump 12 and a TFF module 14, a tubing set 18 much be provided having a selected ID 20, the tubing set 18 being operative to define at least a feed flow path 22 between the feed pump 12 and the TFF module 14, and a retentate flow path 24 downstream of the TFF module 14. The tubing set 18 may be any type of tubing suitable for use in a TFF system 10, including both single-use tubing and tubing suitable for more than a single use.

Once a tubing having a selected ID 20 is selected, the TFF system 10 must be configured to incorporate a pump head 26 at the feed pump 12 suitable for the selected ID. Many existing TFF systems 10 utilize feed pumps 12 which may be capable of handling substantially higher volumes of feed fluid and conveying them at the proper pressure and volumes to the TFF module 14, but which are restricted to a lower maximum fluid flow volume owing to the presence of a pump head 26 at the fluid pump which may only accept or interfacing with a tubing having a particularized internal diameter 20. However, it may be seen that by incorporating a pump head 26 at the feed pump 12 suitable for the selected ID 20, which may not necessarily require replacement of the pump itself, but rather may only require reconfiguration of the control elements of the pump to cause the pump to operate at the correct parameters for use with the different ID tubings, then the same pump may be used in the modified TFF system 10 using the different ID tubings. For example, Quattroflow's range edition for their single use series quattroflow pumps utilize a motor for the QF1200SU pump. Quattroflow has developed adapters that allow for the smaller QF150SU, and QF30SU pump heads to pair with the larger motor. Utilizing software limitations, the pump motor's max speed can be limited to the appropriate amount based on the installed configuration.

Another aspect of the TFF system 10 which may be incorporated in order to modify the flow capabilities is a pressure sensor suitable for the selected ID 20. Pressure sensors are important for monitoring the status of fluids within a TFF system 10 and of the system itself as a whole, and may be incorporated at multiple places within the fluid flow paths of a TFF system, including both after the source of feed fluid 16, between the feed pump 12 and the TFF module 14, and downstream of the TFF module 14, such as in a retentate flow path. An exemplary pressure sensor may utilize, for example, a hose barb connection into the flow path, and may include a connection for interfacing with the controller of the TFF system 10 (e.g., a mechanical or electronic industrial controller, or a general-use computer running specialized software), such as a cable. It is also contemplated that wireless solutions may be utilized to communicate with the controller of the TFF system 10. As may be seen, in a retrofit kit, a pressure sensor could be included which matches the ID 20 of the tubing or is otherwise suitable for use with the tubing, and in an exemplary embodiment of such a retrofit kit, the pressure sensor could be already integrated into the flow path of the tubing such that no further assembly is required by the end user to manipulate the sensor itself beyond connecting the sensor to the controller. Many types of pressure sensors, which function to measure pressure according to many different principles of operation, are known in the art, as well as many ways of interfacing pressure sensors to controllers, including future developed pressure sensors, and as such, the presently contemplated disclosure is not intended to be limited to any particular conception of a pressure sensor, but may utilize any known or future developed pressure sensor.

Another aspect of the TFF system 10 which may be incorporated in order to modify the flow capabilities is a conductivity sensor suitable for the selected ID 20. Conductivity sensors are important for monitoring the status of fluids within a TFF system 10 and of the system itself as a whole, and may be incorporated at multiple places within the fluid flow paths of a TFF system 10. An exemplary conductivity sensor may utilize, for example, a hose barb connection into the flow path in combination with an ultraviolent wavelength measurement system to determine optical density in order to derive a conductivity of a fluid flowing through the flow path at any given time and location, and may include a connection for interfacing with the controller of the TFF system 10 (e.g., a mechanical or electronic industrial controller, or a general-use computer running specialized software), such as a cable. It is also contemplated that wireless solutions may be utilized to communicate with the controller of the TFF system 10. As may be seen, in a retrofit kit, a conductivity sensor could be included which matches the ID 20 (and potentially the external diameter as well) of the tubing or is otherwise suitable for use with the tubing, and in an exemplary embodiment of such a retrofit kit, the conductivity sensor could be already integrated into the flow path of the tubing such that no further assembly is required by the end user to manipulate the sensor itself beyond connecting the sensor to the controller. Many types of conductivity sensors, which function to measure conductivity according to many different principles of operation, are known in the art, as well as many ways of interfacing conductivity sensors to controllers, including future developed conductivity sensors, and as such, the presently contemplated disclosure is not intended to be limited to any particular conception of a conductivity sensor, but may utilize any known or future developed conductivity sensor.

Another aspect of the TFF system 10 which may be incorporated in order to modify the flow capabilities is a flow sensor suitable for the selected ID 20. Flow sensors are important for monitoring the status of fluids within a TFF system 10 and of the system itself as a whole, and may be incorporated at multiple places within the fluid flow paths of a TFF system 10. An exemplary flow sensor may utilize, for example, a hose barb connection into the flow path in combination with a mechanical, fluidic, electrical, magnetic, or sonic subsystem (e.g., a transit-time ultrasonic flow meter), to measure the fluid in order to determine the mass or volume of fluid flowing through the flow path at any given time and location, and may include a connection for interfacing with the controller of the TFF system 10 (e.g., a mechanical or electronic industrial controller, or a general-use computer running specialized software), such as a cable. It is also contemplated that wireless solutions may be utilized to communicate with the controller of the TFF system 10. As may be seen, in a retrofit kit, a flow sensor could be included which matches the ID 20 (and potentially the external diameter as well) of the tubing or is otherwise suitable for use with the tubing, and in an exemplary embodiment of such a retrofit kit, the flow sensor could be already integrated into the flow path of the tubing such that no further assembly is required by the end user to manipulate the sensor itself beyond connecting the sensor to the controller. Many types of flow sensors, which function to measure conductivity according to many different principles of operation, are known in the art, as well as many ways of interfacing flow sensors to controllers, including future developed flow sensors, and as such, the presently contemplated disclosure is not intended to be limited to any particular conception of a flow sensor, but may utilize any known or future developed flow sensor.

Another aspect of the TFF system 10 which may be incorporated in order to modify the flow capabilities is a pH sensor suitable for the selected tubing set 18. pH sensors may be important for monitoring the status of fluids within a TFF system 10 and of the system itself as a whole, and may be incorporated at multiple places within the fluid flow paths of a TFF system 10. An exemplary pH sensor may utilize, for example, a hose barb connection into the flow path in combination with an electrical subsystem to measure the fluid in order to determine the pH of the fluid passing the flow path at any given time and location, and may include a connection for interfacing with the controller of the TFF system 10 (e.g., a mechanical or electronic industrial controller, or a general-use computer running specialized software), such as a cable. It is also contemplated that wireless solutions may be utilized to communicate with the controller of the TFF system 10. As may be seen, in a retrofit kit, a pH sensor could be included which is suitable for use with the tubing, and in an exemplary embodiment of such a retrofit kit, the pH sensor could be already integrated into the flow path of the tubing such that no further assembly is required by the end user to manipulate the sensor itself beyond connecting the sensor to the controller. Many types of pH sensors, which function to measure conductivity according to many different principles of operation, are known in the art, as well as many ways of interfacing pH sensors to controllers, including future developed pH sensors, and as such, the presently contemplated disclosure is not intended to be limited to any particular conception of a pH sensor, but may utilize any known or future developed pH sensor.

Another aspect of a TFF system 10 which may be configured in order to modify the flow capabilities is to provide one or more backpressure valves suitable for operating with the selected ID 20 of the tubing set 18. A backpressure valve is a type of control valve that holds pressure within systems and releases pressure when a designated set point is reached. Because efficiency of a TFF system 10 may be better realized when a narrow pressure range is maintained at certain points within the system, a backpressure valve which functions with the selected ID 20 of the tubing set 18 may be important. It may thus be seen that a method of modifying a TFF system 10 may thus involve adapting or reconfiguring an existing backpressure valve to the selected ID tubing, or replacing an existing valve with a suitable replacement. As may be seen, in a retrofit kit, one or more backpressure valves or backpressure valve retrofit components may be included which matches the ID and/or ED of the tubing, or is otherwise suitable for use with the tubing, and in an exemplary embodiment of such a retrofit kit, one or more backpressure valves could be already integrated into the flow path of the tubing such that no further assembly is required by the end user to manipulate a backpressure valve itself beyond connecting the backpressure valve to the controller, if necessary.

Another aspect of a TFF system 10 which may be configured in order to modify the flow capabilities is to provide one or more pinch valves suitable for operating with the provided tubing set 18. Many existing pinch valves in existing TFF systems 10 may only function with a predefined tubing size, typically with a tubing have a specific predefined external diameter (ED). Thus, it may be seen that in order to modify or retrofit an existing TFF system 10 to utilize a tubing having a larger ID, and in order to avoid the expense of obtaining new pinch valves to control the fluid flow therethrough, it may be necessary to also reconfigure the pinch valves of the system to accept and permit control of the new tubing set 18. For example, many pinch valves may utilize a piston (e.g., hydraulic or solenoid-controlled) with a pinch mechanism in combination with a support for the tubing, and it may be possible to retrofit or otherwise modify an existing pinch valve to accept a larger size of tubing simply by replacing a tubing support element, which in many cases may function to cradle and retain the tubing in place opposite the pinch mechanism. Likewise, it may be necessary to replace the pinch mechanism or the source of motive power for the pinch mechanism. As may be seen, in a retrofit kit, one or more pinch valves or pinch valve retrofit components may be included which matches the ID 20 and ED of the tubing, or is otherwise suitable for use with the tubing, and in an exemplary embodiment of such a retrofit kit, one or more pinch valves could be already integrated into the flow path of the tubing such that no further assembly is required by the end user to manipulate any pinch valve itself beyond connecting the pinch valve to the controller, if necessary. It may be seen that many different schemes for adapting or retrofitting existing pinch valves to accommodate new tubing sets 18 may be realized, and that in certain cases pinch valves may need to be replaced entirely.

Another aspect of a TFF system 10 is a controller for controlling at least the feed pump 12, and for monitoring and controlling other components of the TFF system 10. According to various embodiments, it may be seen that the controller may be a mechanical or electronic industrial controller, or a general-use computer running specialized software, or any other type of system which may be used as a controller to control the various aspects of a TFF system 10. In particular, it may be seen that according to the various embodiments of the herein disclosed methods and systems, it may be necessary to modify the controller so that the TFF system 10 functions and/or may function more optimally with the new tubing set 18, including configuring the controller to interface with the one or more pressure sensors. According to certain conceptions of the present disclosure, it may even be seen that for TFF systems 10 in which control of the system may be realized through a very simple controller, which may be a simple as simply an on/off switch for the feed pump 12 or a voltage controller therefore, or a non-reprogrammable industrial controller, it may be necessary for a retrofit kit or modification to alter or replace these components directly in order to achieve the modifications described herein. However, it may be seen that in other embodiments of a controller, such as a purely software-based controller running on a general-purpose computer system, the modification of the controller may involve modifying the operating parameters of the software. Accordingly, it is contemplated that as an aspect of the modification, the controller may have incorporated therein a mode whereby it may be selectable transitionable between a first ID configuration and second ID configuration in response to a determined ID of the providing tubing set 18. Such determination may be made in response to an input by a user of the ID 20 of the presently utilized tubing set 18 (e.g., a user inputting the new ID on the user interface via a selection menu), or may be made automatically (e.g., in response to determinations made at one or more of the sensors. As such, it may be seen that it could be desirable for the selective transition to be readily reservable, such as in a system where the controller may be readily toggled between different pre-set modes according to the ID 20 chosen, and to control the feed pump 12 and the other subsystems of the TFF system 10 in accordance with the selected internal diameter 20.

It may further be seen that the first and second ID configurations may have associated therewith a set of control parameters associated therewith to control at least the feed pump 12, and preferably the other components of the TFF system 10 in accordance with those control parameters when the controller is transitioned to the first and second ID configurations. For example, such control parameters may involve an intricate algorithmic process implemented by software or hardware which considers as inputs the measurements taken at the various sensors of the TFF system 10, in order to operate the TFF system 10 differently depending on the specific ID configuration to which the controller is transitioned to. For example, the controller may be operative to receive an inputted desired flow rate, and the control parameters may cause the controller to control at least the feed pump 12 to operate in accordance with the inputted desire flow rate and in accordance with the set of control parameters associated with the selected ID configuration. In a more particular embodiment, the controller may be operative to vary control of at least the feed pump 12 in accordance with feedback received from one or more of the sensors. For example, the controller may be operative to vary control of at least the feed pump 12 after receiving an inputted desired flow rate in response to feedback from at least one of the flow sensors in order to cause a flow rate derived from measurements taken at that at least one flow sensor to converge with the input desired flow rate. As such, it may be seen that a control system which relies on feedback to maintain a flow rate dynamically may be achieved. It may be seen that there are many different schemes for control systems in order to control TFF systems 10 and other fluidic systems are known in the art or which may be future developed, including those which may rely on dynamic feedback from various types and numbers of sensors, and the present disclosure is not intended and should not be construed to limit its scope to particular embodiments of such control systems, all of which are intended to be encompassed by the present methods.

It may further be seen that a retrofit kit may further include a non-transitory computer readable medium, the medium tangibly embodying one or more programs of instructions executable by the controller to implement any of the above describe control systems for controlling at least the feed pump 12. For example, this may be a computer software program which may be installed on a general-purpose computer, and included within a retrofit kit in a physical or digital form (e.g., on a physical CD-ROM or a USB memory drive packaged within a retrofit kit, or downloaded over the internet to the hard drive of a general purpose computer).

Alternatively, this medium may be a hardware module for or embodying an industrial controller, such as a circuit or a programmable logic controller (PLC) or programmable logic relay or other type of microchip or single-board computer, which may be installed as or with a controller on a TFF system 10. It may be seen that there are many different conceptualizations of controllers or elements thereof which may be a medium tangibly embodying one or more programs of instructions executable to implement the herein described control systems for controlling the subcomponents of a TFF system 10, and as such, the present disclosure is not intended and should not be construed to limit its scope to particular embodiments of such mediums, all of which are intended to be encompassed by the present methods.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. A method for modifying a flow capability of an existing tangential flow filtration system having at least a feed pump and a tangential flow filtration module, the method comprising the steps of:
    providing a tubing set having a selected internal diameter, the tubing set being operative to a define at least a feed flow path between the feed pump and the tangential flow filtration module, and a retentate flow path downstream of the tangential flow filtration module;
    configuring the tangential flow filtration system to incorporate a pump head at the feed pump suitable for the selected internal diameter;
    configuring the tangential flow filtration system to incorporate one or more pressure sensors suitable for the selected internal diameter, the one or more pressure sensors being operative to measure fluid within at least one of the feed flow path and the retentate flow path;
    configuring the tangential flow filtration system to incorporate one or more conductivity sensors suitable for the selected internal diameter, the one or more conductivity sensors being operative to measure fluid within at least one of the feed flow path and the retentate flow path;
    configuring the tangential flow filtration system to incorporate one or more flow sensors suitable for the selected internal diameter, the flow sensor being operative to measure fluid within at least one of the feed flow path and the retentate flow path; and
    installing the tubing set having the selected internal diameter at the tangential flow filtration system
    wherein the tangential flow filtration system further includes a controller, wherein the method further comprises the steps of configuring the controller to interface with the incorporated one or more pressure sensors, conductivity sensors, and flow sensors; and
    wherein the controller is configured to be selectably transitionable between a first internal diameter configuration and a second internal diameter configuration in response to a determined internal diameter of the provided tubing set.

2. The method of claim 1, wherein each of the first and second internal diameter configurations has a set of control parameters associated therewith, and wherein the controller is operative to control at least the feed pump in accordance with a predefined set of control parameters associated with the selected one of the first and second internal diameter configurations.

3. The method of claim 2, wherein the controller is operative to receive an inputted desired flow rate, and wherein each predefined set of control parameters is configured to cause the controller to control at least the feed pump in accordance with the inputted desired flow rate.

4. The method of claim 2, wherein the controller is operative to vary control of at least the feed pump in accordance with feedback from one or more of one or more pressure sensors, conductivity sensors, and the flow sensors.

5. The method of claim 4, wherein the controller is operative to receive an inputted desired flow rate, and wherein the controller is further operative to vary control of at least the feed pump in accordance with feedback from at least one of the flow sensors to in order to cause a flow rate derived from measurements taken at the one or more flow sensors to converge with the inputted desired flow rate.

* * * * *